United States Patent [19]
Wilkins

[11] Patent Number: 6,007,106
[45] Date of Patent: Dec. 28, 1999

[54] HYDRAULIC COUPLING

[75] Inventor: Steven Wilkins, Union City, Pa.

[73] Assignee: Snap-Tite Technologies, Inc., Wilmington, Del.

[21] Appl. No.: 09/037,184

[22] Filed: Mar. 9, 1998

Related U.S. Application Data

[60] Division of application No. 08/672,145, Jun. 27, 1996, which is a continuation-in-part of application No. 08/197,635, Feb. 17, 1994, Pat. No. 5,556,139, which is a continuation-in-part of application No. 08/145,688, Oct. 29, 1993, abandoned.

[51] Int. Cl.[6] .............................. F16J 15/18; F16L 37/00
[52] U.S. Cl. ........................ 285/110; 285/351; 285/348; 285/111; 277/549; 277/564; 277/566
[58] Field of Search .................................. 285/351, 348, 285/110, 111; 277/549, 559, 555, 564, 562, 566, 570

[56] References Cited

U.S. PATENT DOCUMENTS

| | | | |
|---|---|---|---|
| 3,279,806 | 10/1966 | Bialkowski | 277/549 |
| 3,840,257 | 10/1974 | Moore | 285/334.3 |
| 3,890,068 | 6/1975 | Davidson | 418/132 |
| 4,111,441 | 9/1978 | Sick et al. | 277/566 |
| 4,371,177 | 2/1983 | Bahr et al. | 277/566 |
| 4,530,675 | 7/1985 | Mazziotti | 277/566 |
| 5,072,755 | 12/1991 | Wilcox | 137/614.03 |
| 5,205,568 | 4/1993 | Stoll et al. | 277/549 |

*Primary Examiner*—Eric K Nicholson
*Attorney, Agent, or Firm*—Woodling, Krost and Rust

[57] ABSTRACT

A hydraulic coupling employing a polymeric elastomeric sealing member to provide an excellent seal under pressure. The polymeric elastomeric seal additionally has high resistance to acids, alkalis, hydrocarbons, ketones, ethers, esters, alcohols and salt solutions. The sealing member has the elasticity to return to its normal physical condition after pressure is removed.

2 Claims, 17 Drawing Sheets

HYDRAULIC COUPLING

This application is a division of U.S. patent application Ser. No. 08/672,145 filed Jun. 27, 1996 which is a continuation-in-part of U.S. patent application Ser. No. 08/197,635 filed Feb. 17, 1994 now U.S. Pat. No. 5,556,139 which is a continuation-in-part of Ser. No. 08/145,688 filed Oct. 29, 1993 entitled "Hydraulic Coupling" now abandoned.

The invention relates in general to hydraulic couplers and particularly to one uniquely adapted for use in subsea applications and other harsh environments.

The prior art of hydraulic couplers illustrate the many and varied sealing members that have been used to seal between male and female members. The sealing members have varied from soft materials such as felt, rubber and soft synthetic resinous materials to hard metal materials such as stainless steel and other metal alloys.

These materials have met with varying success and in most instances the use of one material for a given advantage is a trade off because it also has a given disadvantage. For example, the rubbers and soft synthetic resinous materials do not have sufficient strength to withstand high pressure applications and metal seals are so hard as to scratch or mar the surfaces on the male or female member which they engage to provide the seal. The metal seals also have a tendency to interact with sand and/or to scratch the coupler surfaces.

The purpose and object of this invention is to provide a sealing member in combination with a male and female member of a coupler which fits between the extremes outlined above.

An object of the invention is to provide a sealing member which has sufficient strength to handle high pressure applications but will not scratch or otherwise mar the coupler surfaces. Another object of the invention is to provide a sealing member constructed of a polymeric elastomeric material which has physical characteristics to accomplish the objects stated herein.

Another object of the invention is to prevent the blowout of the sealing member during disconnection of the male and female members.

The sealing member of the invention has the correct deformation qualities to provide an excellent seal under pressure but also has the elasticity to return to its normal physical condition after pressure is removed.

In the instant invention, it is desirable that the opening in the sealing member which the male member "sees" be the same diameter each time the male and female member are connected. In the use of metal sealing members or rings the opening gradually becomes larger and larger with each use resulting in a less and less effective seal against flow of fluid along the interface between the sealing member and the movable coupler part.

Another object of the invention is to provide polymeric seals which may be employed in a balanced coupler.

Another object of the invention is to provide a plurality of polymeric seals which seal against the escape of fluid from within the coupling and from the entrance of seawater outside the coupling.

DETAILED DESCRIPTION OF THE INVENTION

Figure 1:
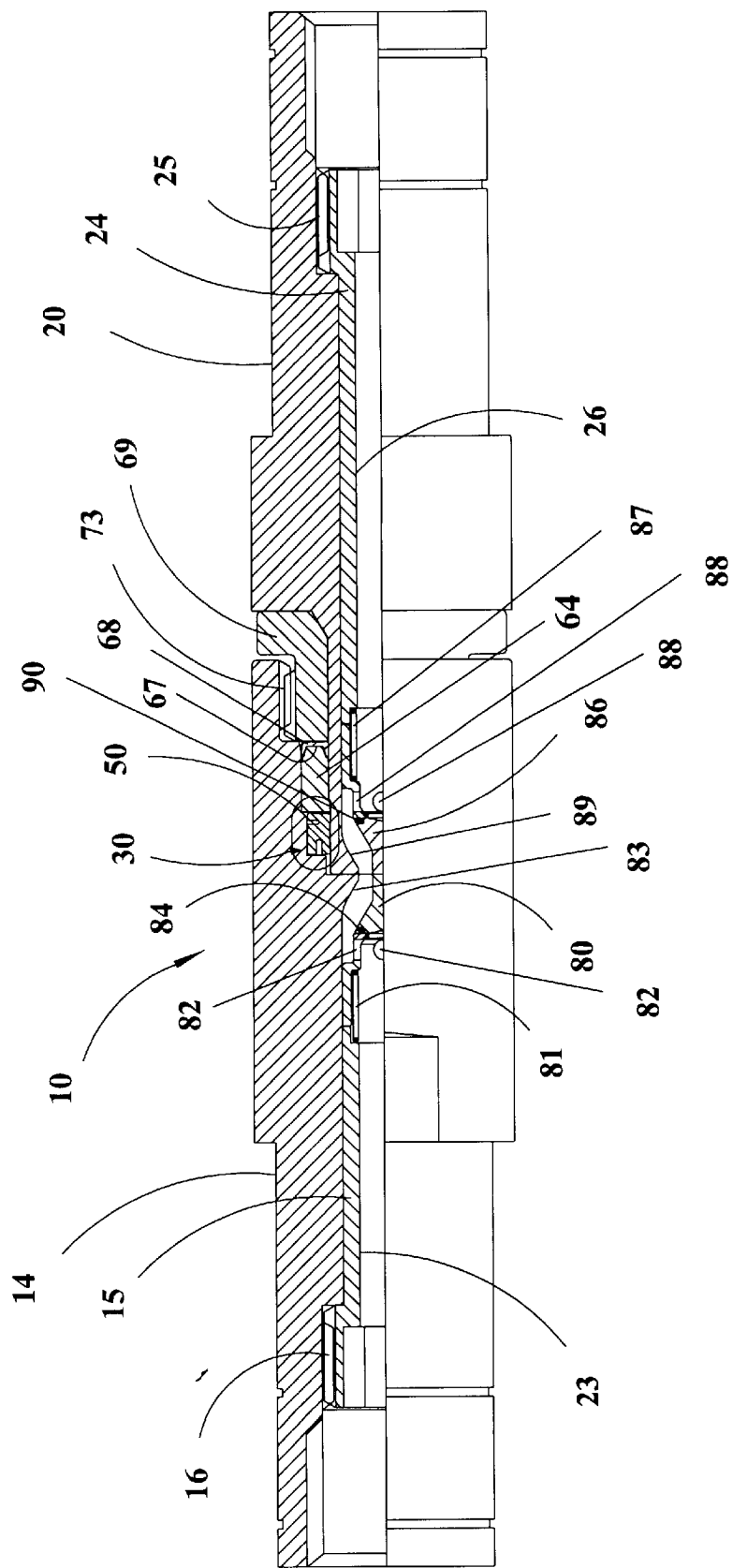
FIG. 1 is an elevational view of a hydraulic coupler partially in section and with the male and female members connected.
Figure 3:
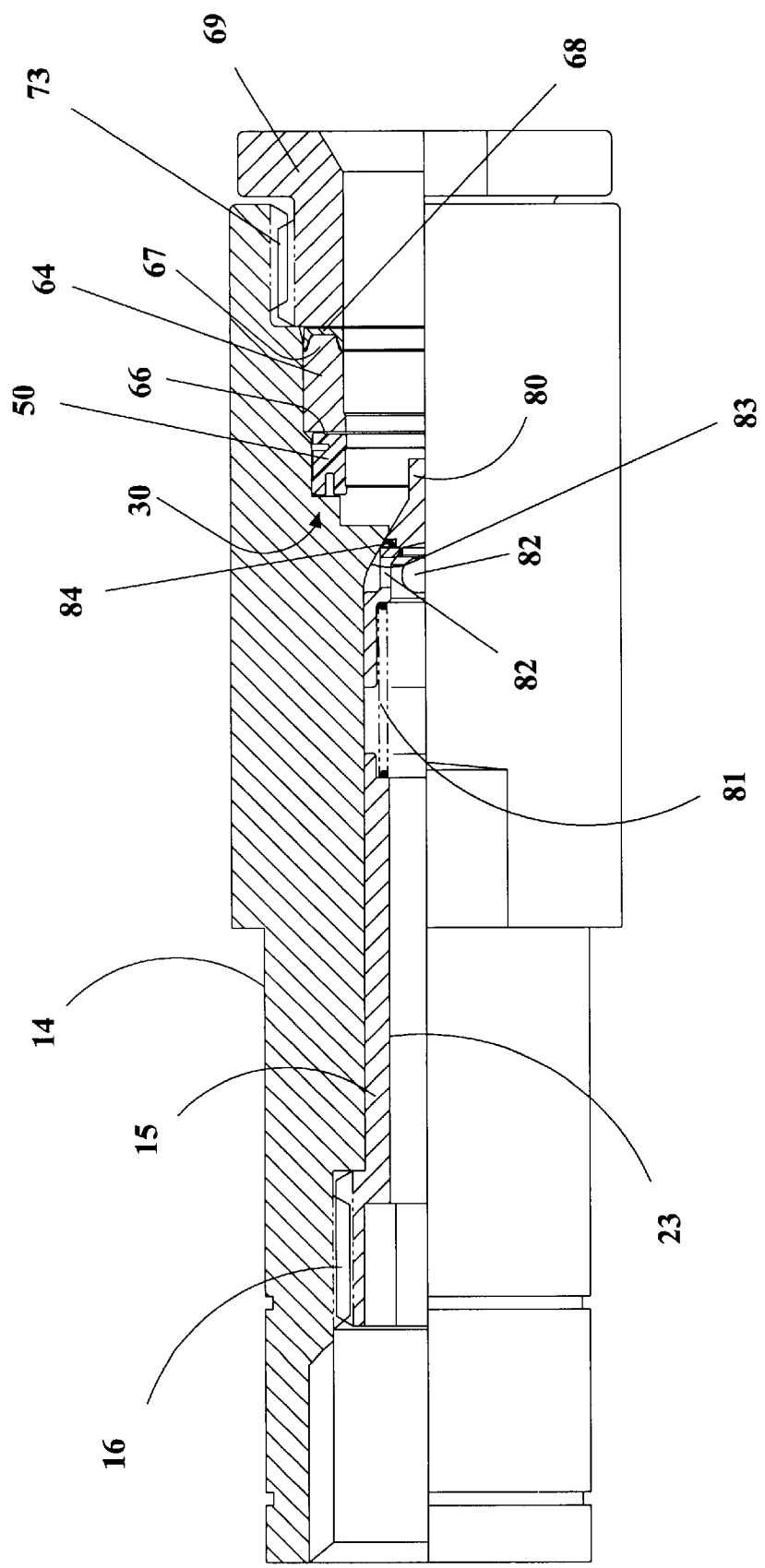
FIG. 3 is a view illustrating the female coupler member of FIG. 1 in the disconnected condition.
Figure 4:
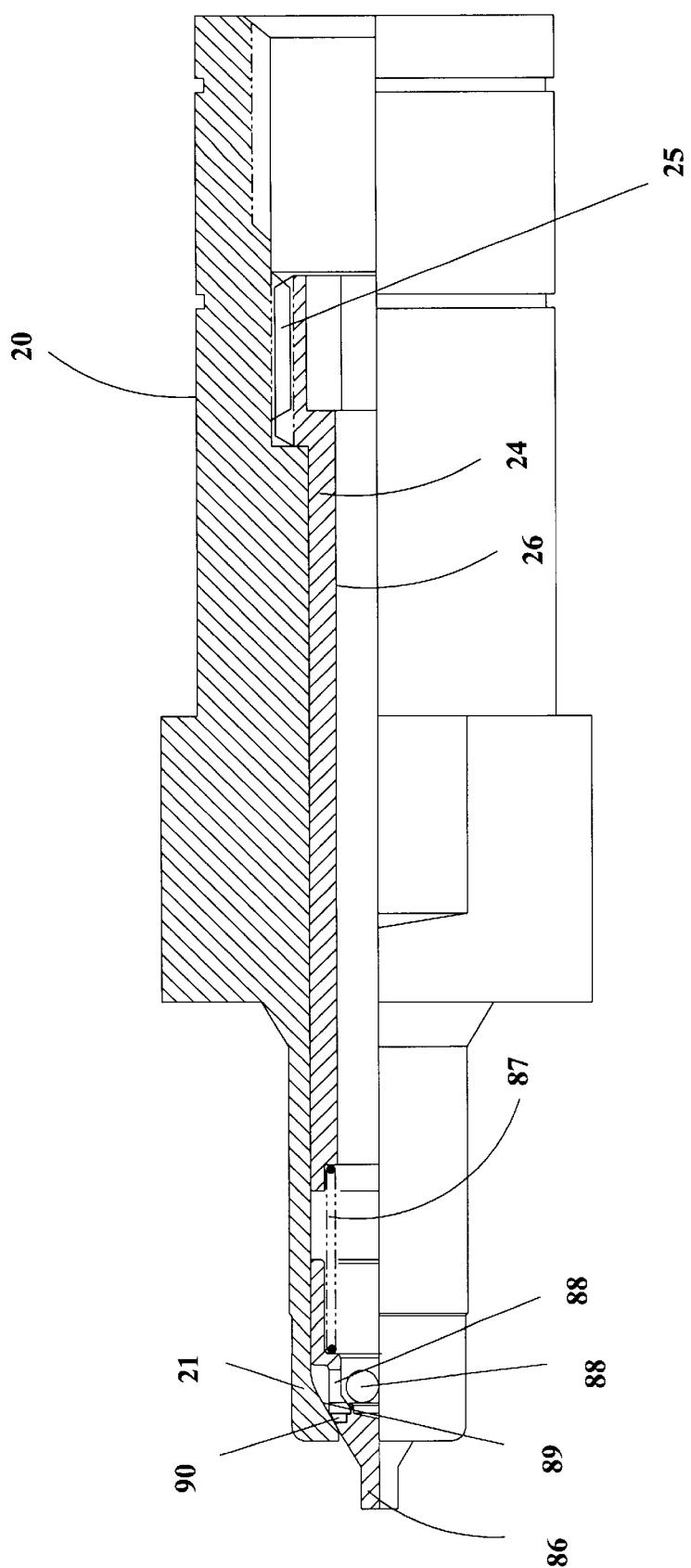
FIG. 4 is a view illustrating the male coupler of FIG. 1 in the disconnected condition.

One hydraulic undersea coupler is illustrated in FIGS. 1, 3 and 4 of the drawings and has been identified generally by the reference numeral 10. The coupler includes generally a female member 14 and a male member 20 movable between coupled condition illustrated in FIG. 1 and uncoupled condition illustrated in FIGS. 3 and 4. The female member includes a main body 14 and internal insert member 15 which is threadably secured in place by thread 16 as shown in FIGS. 1 and 3. In similar fashion, the male member includes a main body 20 and includes an internal insert member 24 which is threadably secured in the position shown in FIGS. 1 and 4 by means of threads 25.

First wall means 23 define a first passage or bore through the female member 14 which provides for the flow of fluid from one open end of the female member through the passage and to the other end of the female member. In like fashion, second wall means 26 are provided in the male member to define a second passage or bore through the male member to provide for the flow of fluid through one end of the male member to the other end thereof. See FIG. 1.

A first check valve 80 is provided in the female member as shown in FIGS. 1 and 3 and a spring 81 normally biases the first check valve to its closed condition as illustrated in FIG. 3. A valve seat 83 is provided in the passage of a bore 23 in the female member and this is essentially a surface which is engaged by the check valve and particularly an elastomeric portion 84 on the check valve. The check valve 80 is provided with a plurality of annularly spaced ports 82 which provide for the flow of fluid through the check valve when it is in its open condition as illustrated in FIG. 1.

In like fashion, the male member is provided with a second check valve 86 which is constantly biased or urged to closed condition by a spring 87. See FIG. 4. The open condition of the check valve 86 is illustrated in FIG. 1 and its closed condition is shown in FIG. 4. The passage or bore 26 of the male member is provided with a valve seat 89 which engages the check valve 86 and particularly an elastomeric portion 90 carried by the check valve when it is in closed position as shown in FIG. 4. The check valve 86 is provided with a plurality of circumferentially spaced ports 88 which provide for the passage of fluid through check valve 86 in its open condition as shown in FIG. 1.

Figure 2:
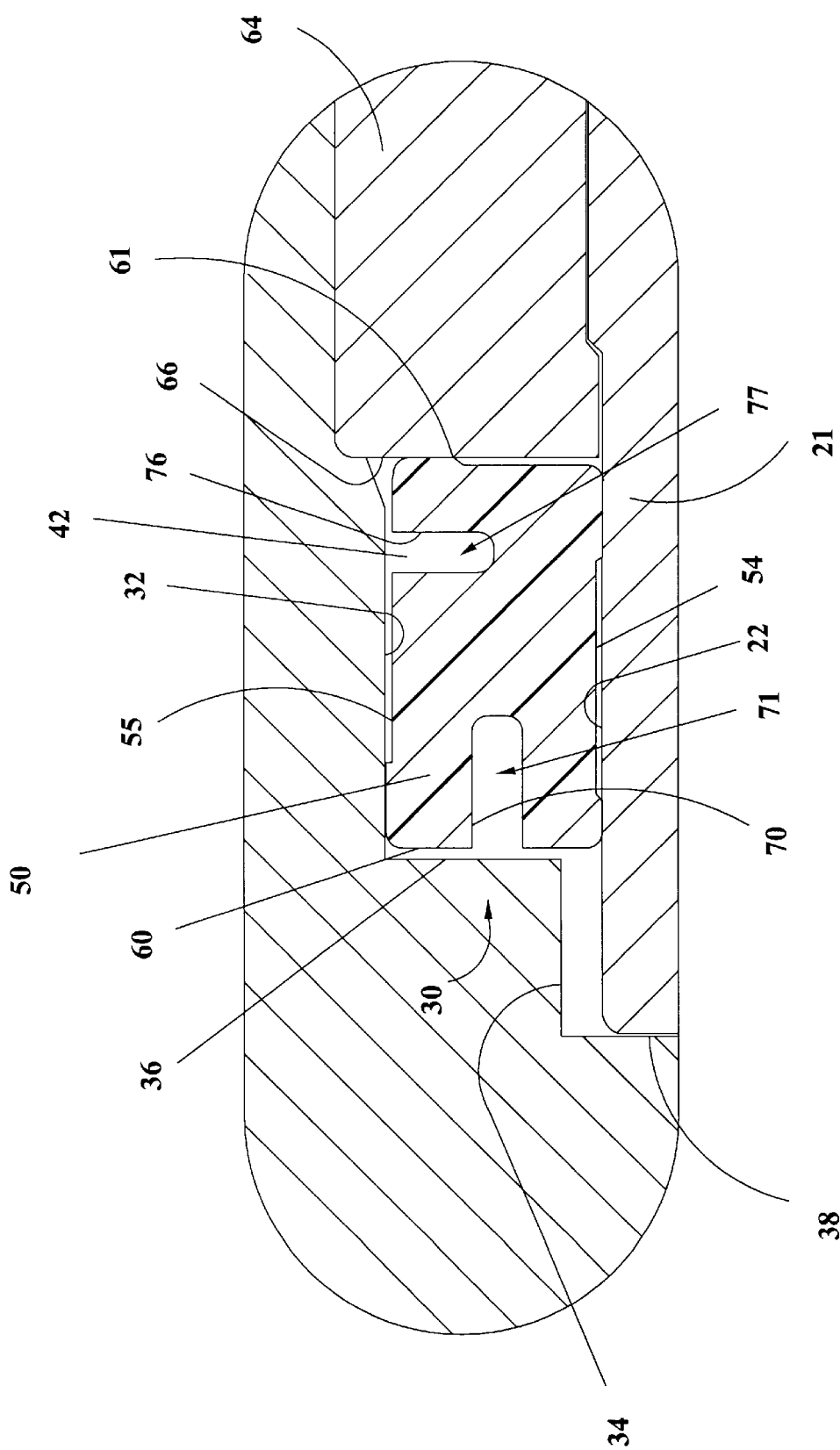
FIG. 2 is an enlarged fragmentary section of a portion of a hydraulic coupler illustrated in FIG. 1.

The first wall means 23 which defines the first passage or first bore in the female member 14 in the end of the female member closest to where the male member 20 is inserted into the female member is provided with a shoulder 30 which is generally shown in FIGS. 1 and 3 and is shown in substantial detail in the enlarged fragmentary view of FIG. 2.

The shoulder 30 is defined by first and second radially spaced and axially extending surfaces 32 and 34 and first and second axially spaced and radially extending surfaces 36 and 38. The male member 20 has a first end portion 21 (FIG. 2) which resides in the first passage or bore 23 of the female member 14 in the coupled condition of the coupler as illustrated in FIG. 1.

The first end portion 21 has an external circumferentially extending surface 22 spaced from the first axially extending surface 32 and located close to the second axially extending surface 34 in the coupled condition best shown in FIGS. 1 and 2. The external surface 22 of the male, the first axially extending surface 32, the first radially extending surface 36, and the first end surface 66 of retainer 64 define an annularly extending space or annulus 42. An annularly extending sealing member or seal 50 resides in the space 42. As seen in FIG. 2, this annularly extending sealing member in cross section is generally rectangularly shaped and as mentioned before, resides in the space 42. The sealing member 50 has inner and outer circumferentially extending surfaces 54 and 55, respectively, lying adjacent the external surface 22 of the male member and the first axially extending surface 32, respectively. The sealing member 50 also has first and second end surfaces 60 and 61, respectively, with the first end surface being located adjacent the first radially extending surface 36.

An annularly extending annular retainer 64 is provided as shown which has first and second axially spaced end surfaces 66 and 67, respectively, (FIGS. 2 and 3) with the first end surface 66 being located adjacent the second end surface 61 of the sealing member to hold the sealing member in the annular space 42. An adaptor 69 (FIGS. 1 and 3) is threadably connected by means of threads 73 to the body 14 of the female member and serves to hold the annular retainer 64 and the sealing member 50 in the position illustrated in FIG. 1. A channel shaped seal 68 which extends annularly around the coupler is interposed between the adaptor 69 and the annular retainer 64 to assist in sealing against the escape of fluid pressure. As best seen in FIG. 2, a first wall 70 extends into the first end surface 60 of the sealing member 50 and defines a first cavity 71 which faces the first radially extending surface 36 of the shoulder and creates a generally C-shaped appearance in cross section. In similar manner, a second wall 76 extends into the outer circumferentially extending surface 55 of the sealing member 50 and defines a second cavity 77 facing the first axially extending surface 32 of the shoulder and creating a generally U-shaped appearance in cross section. The sealing member 50 of the present invention is constructed of a polymeric elastomeric material which accomplishes the objects that have been stated hereinabove in a manner consistent with accomplishing the teachings of the present disclosure.

In operation and assuming the coupler is in the uncoupled condition as illustrated in FIGS. 3 and 4, and in this condition, the check valves 80 and 86 are in the closed condition preventing fluid flow through the female member and the male members.

As the male and female members are brought towards coupled condition, the extreme ends of the check valves 80 and 86 engage each other and move each other to the open condition shown in FIG. 1 against the force or bias of springs 81 and 87. The male and female members are maintained mechanically in this connected position by a means not shown or illustrated herein but well understood by those skilled in the art. In many instances, the male members are fixedly mounted subsea on a physical support member and a corresponding plurality of the female members are lowered subsea into the connected position of FIG. 1 and held together by a means not illustrated.

As the end portion 21 of the male member 20 passes through the inner diameter of the sealing member 50, the external surface 22 of the male member travels closely adjacent the inner surface 54 of the sealing member.

After the male and female member reach their coupled condition as illustrated in FIG. 1 with their respective check valves in open condition, fluid pressure such as hydraulic fluid is caused to flow, for example, from the left end of the female member 14 as viewed in FIG. 1 through the bore 23, through ports 82 and out through the male member through ports 88 and bore 26 in the male member.

In most circumstances, hydraulic couplers of the type illustrated herein deal with relatively high hydraulic fluid pressure on the order of four or five thousand psi up to 10,000 psi. Referring to FIG. 2, this fluid pressure finds its way along surfaces 38, 34 and 36 into the generally C-shaped cavity 71. This fluid pressure causes the upper and lower portions of the C-shape to tightly and firmly engage surfaces 32 and 22 respectively preventing the escape of hydraulic fluid along surfaces 32 and 22.

The U-shaped cavity 77 which is provided in the sealing member 50 performs the function of assisting and preventing the escape of fluid pressure along surfaces 32 and 61 under some circumstances. In some circumstances, annular space 42 is exposed to fluid pressure which may travel along surfaces 36 and 32 tending to escape past the sealing member. In these circumstances the fluid pressure will be transmitted to the U-shaped cavity 77 which forces the right most leg of the U into firm contact with surface 66 and tends to press surface 55 into engagement with surface 32 tending to provide a better fluid seal under these circumstances. Obviously the U-shaped portion of the seal is an adjunct or addition to the sealing member and is not a necessary inclusion into the sealing member formed by the C-shaped portion of the sealing member which has been defined hereinabove.

Figure 5:
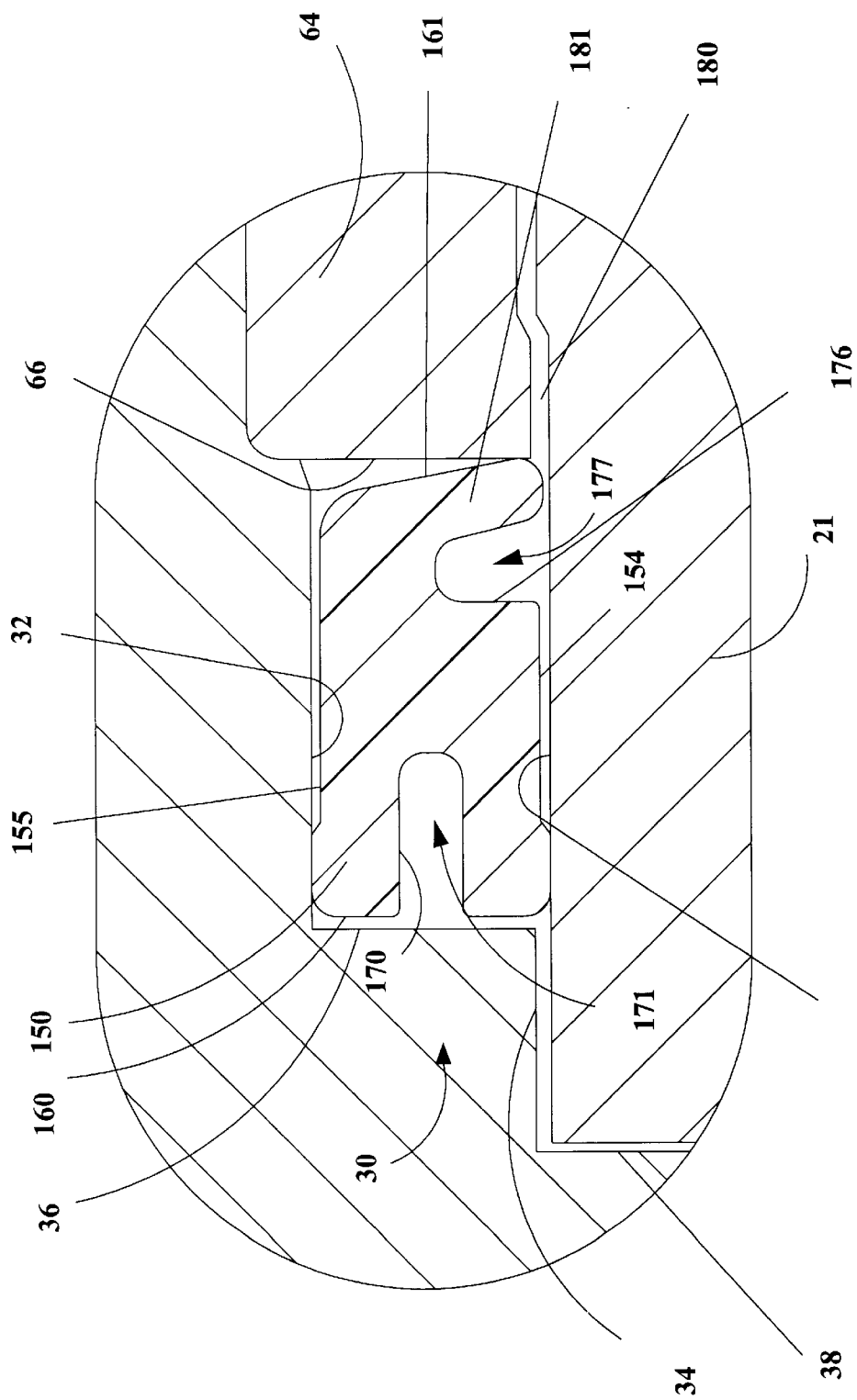
FIG. 5 is an enlarged fragmentary sectional view similar to FIG. 2 but showing a modification of the invention illustrated in FIG. 2.

FIG. 5 illustrates a modification of the invention and shows a sealing member 150 residing in the space 42. In similar fashion, it is generally rectangularly shaped and the inner and outer circumferentially extending surfaces in this embodiment have been identified by the reference numerals 154 and 155, respectively, and they lie respectively adjacent the surfaces 22 and 32. The first and second end surfaces of the sealing member 150 in this embodiment, have been identified by the reference numerals 160 and 161, respectively. The end surface 161 is located adjacent the retainer 64.

A first wall 170 extends into the sealing member 160 and defines a first cavity 171 which faces the surface 36 and creates a generally C-shaped appearance in cross-section. This is quite similar to the construction shown in FIG. 2. A second wall 176 extends into the inner circumferentially extending surface 154 of the sealing member 150 and defines a second cavity 177 which faces the external surface 22 of the male member 20. The cavity 177 creates a generally U-shaped appearance in cross-section which may be referred to more properly as an inverted U-shape.

The structure and function of the device within which the seal of FIG. 5 is incorporated, namely that of the male and female members, is essentially as described in the functioning of the coupler parts illustrated in FIGS. 1, 3 and 4.

When the male and female members are coupled together in connection with the structure illustrated in FIG. 5, the C-shaped cavity 171 which is formed in the sealing member 150 functions essentially in the same manner as described in connection with the C-shaped cavity 71 which is illustrated in FIG. 2.

The inverted U-shaped cavity 177 which is formed in the sealing member 150 performs a general sealing function; however, it is particularly useful in preventing the entrance of seawater into the internal passages in the male and female members. At times there may be a tendency for seawater to attempt to gain entrance to the internal passageway formed in the coupler members, for example, through the space identified by the reference numeral 180 in FIG. 5 which depending upon the tolerance may provide a clearance between the retainer 64 and the male member 20 and particularly the first end portion 21 thereof. In the event seawater, which is under a relatively high pressure, gains entrance through the space 180 to cavity 177 the pressure which enters cavity 177 has a tendency to force what is referred herein as a leg or leg portion formed by the second cavity 177 into engagement with the wall of the retainer 64 preventing seawater from traveling around the sealing member, for example, to the space between surfaces 32 and 155.

Figure 6:
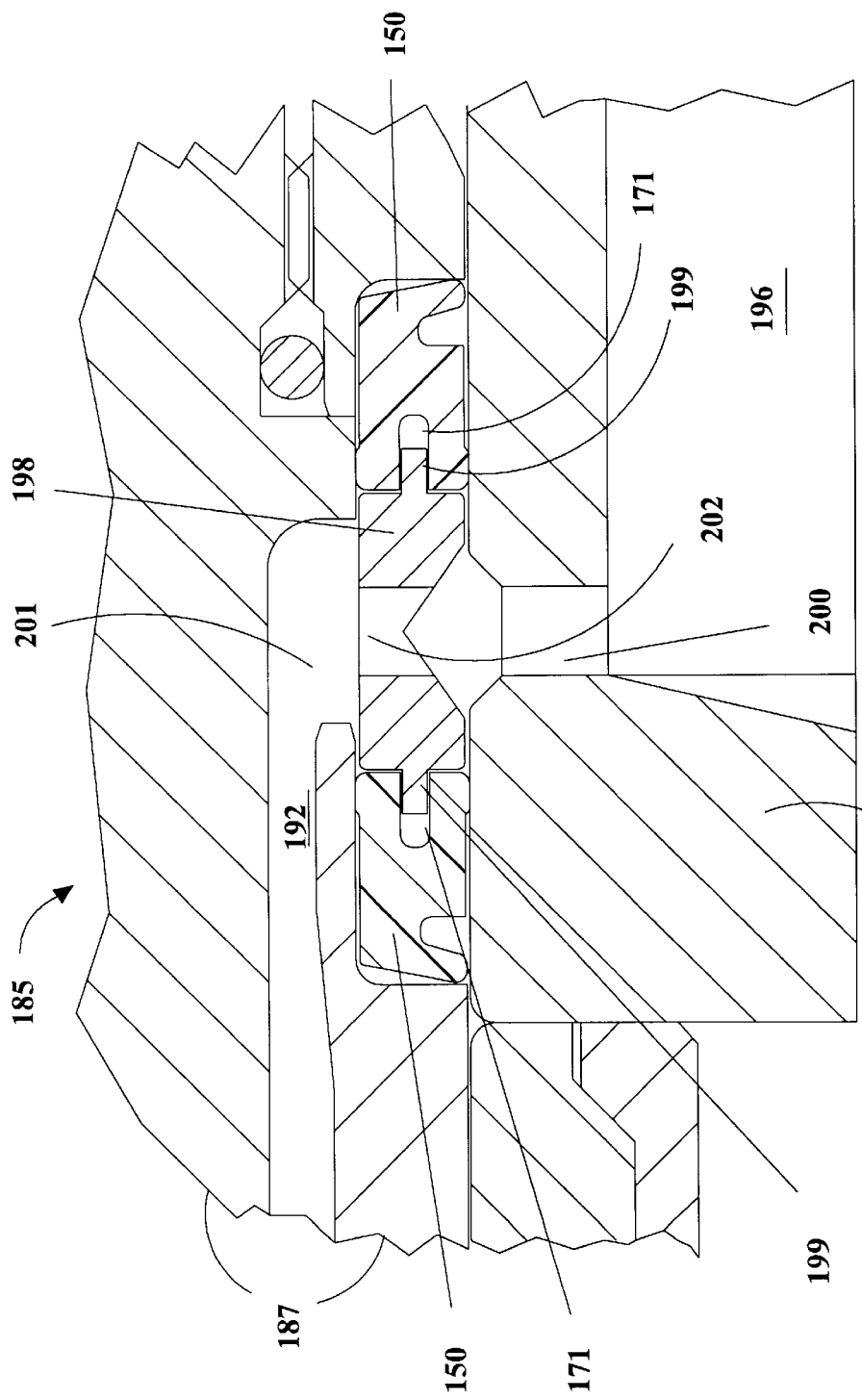
FIG. 6 is an enlarged fragmentary section illustrating the sealing member shown in FIG. 5 as applied to a balanced coupler.

FIG. 6 illustrates use of the specific embodiment shown in FIG. 5 in a balanced coupler which balanced coupler constructions are known to those skilled in the art and may be generally of the type shown in U.S. Pat. No. 5,072,755 issued Dec. 17, 1991.

Referring specifically to FIG. 6 there is shown and illustrated a balanced coupler which includes a female member 187 and a male member 189 shown in assembled or connected position. The female member is provided with a passageway 192 and the male is formed with passageway 196. Port 200 in the passageway 196 in the male member and port 201 in the passageway 192 in the female member provide for the passage of fluid between the two members. FIG. 6 illustrates two sealing members 150, more specifically described in connection with FIG. 5, illustrated and located in shoulders formed in the female member so as to provide sealing engagement between the outer circumferential surface of the male member 189 and a bore formed in the female member 187. A flow port or spacer 198 which has a port 202 for the passage of fluid is provided and located between the two sealing members 150. The spacer 198 is provided with legs 199 on each side which reside in the cavity 171 in the sealing members 150.

The functioning of the sealing members 150 in the balanced coupler 185 is essentially that as described in connection with FIG. 5.

It will also be apparent to those skilled in the art that the embodiment of the seal more specifically described in connection with FIG. 2 may also be utilized in connection with the balanced coupler disclosed and described in connection with FIG. 6.

Figure 7:
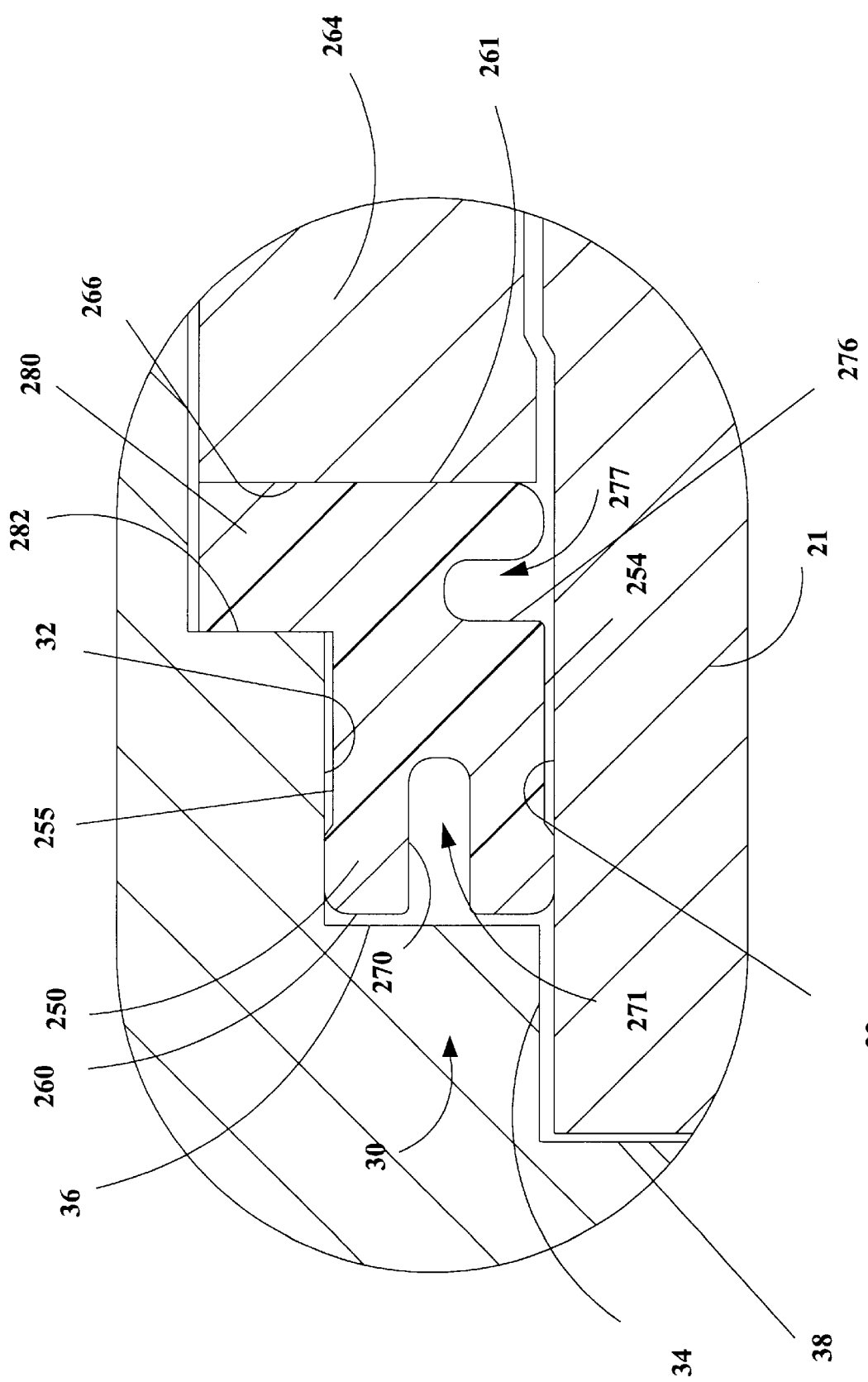
FIG. 7 is an enlarged fragmentary view of a still further modification of the invention over that shown in FIGS. 2 and 5.

FIG. 7 illustrates another modification of the present invention and more particularly a modification of that illustrated in FIGS. 2 and 5. In the embodiment of FIG. 7 there is illustrated an annularly extending sealing member 250 which resides in the space again generally referred to as space 42. The sealing member 250 is provided with inner and outer surfaces 254 and 255 which lie respectively adjacent the surfaces 22 and 32. The sealing member 250 in like fashion has first and second end surfaces 260 and 261, respectively, and the first end surface 260 is located adjacent the surface 36.

In this embodiment the annular retainer is identified by the reference numeral 264 and the first end surface of the retainer is identified by the reference numeral 266.

A first wall 270 extends into the sealing member and defines a first cavity 271. The cavity 271 which is defined is quite similar to the cavity 171 which has been discussed in connection with FIG. 5 and the cavity 71 which has been discussed in connection with FIG. 2.

A second wall 276 extends into the inner surface 254 of sealing member 250 and defines a second cavity 277 which faces the circumferentially extending surface 22 of the end portion 21 of male member 20. The cavity 277 defines generally a U-shape or more properly an inverted U-shape.

The right most end of the sealing member 250 as viewed in FIG. 7 is provided with a generally radially extending flange 280. The flange resides in what is referred to as a recess 282 which has been formed in the female member illustrated in this embodiment.

In this particular embodiment illustrated in FIG. 7, the flange as located in the recess 282 and in combination with the annular retainer 264 provides an additional sealing function which prevents the passage of or leakage of fluid along the connection between the male and female members. In this particular embodiment, it is possible to not use the second cavity 277 which has been illustrated herein and the flange and cavity 271 will function together to provide a satisfactory and suitable sealing arrangement.

Figure 8:
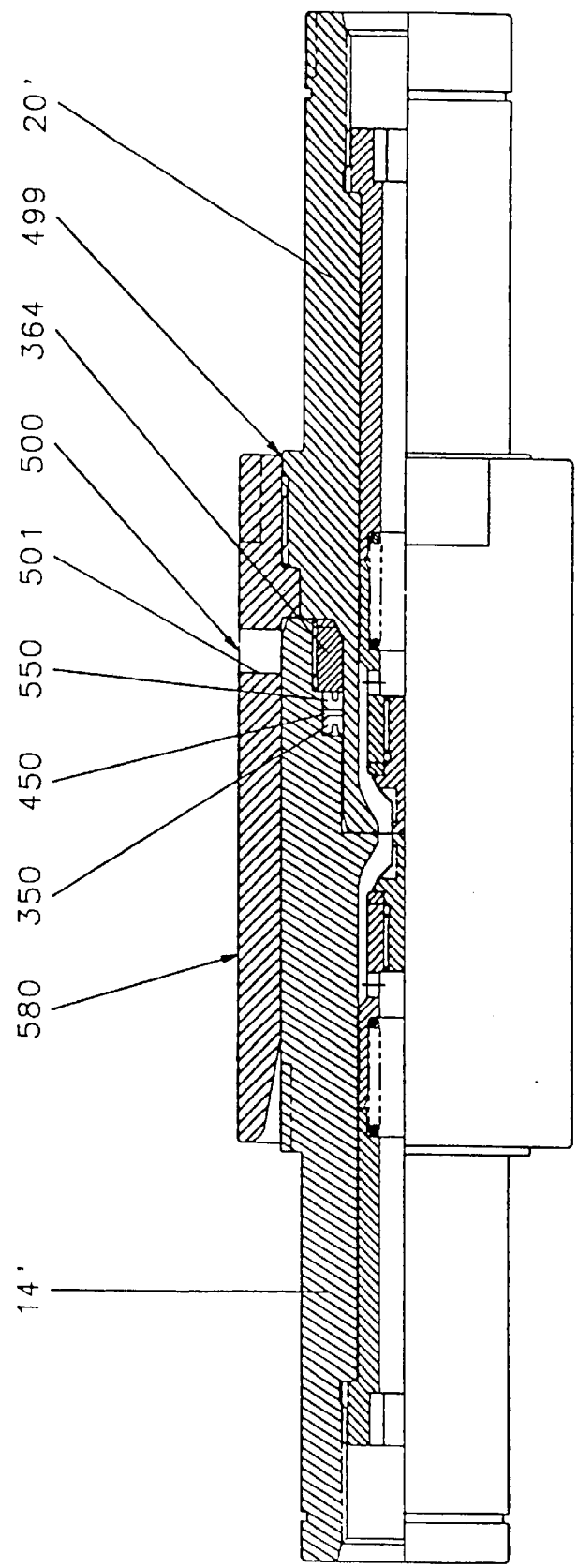
FIG. 8 is an elevational view of another hydraulic coupler partially in section and with the male and female members connected.

FIG. 8 illustrates another modification of the invention. FIG. 8 illustrates a coupling 580 which includes male member 20' and a female member 14'. Retainer 364, male member 20', and female member 14' form annularly extending space 42'. Seals 350, 450 and 550 reside in annularly extending space 42'. See, FIGS. 8, 9 and 16.

In the embodiment of FIG. 8 there is illustrated three annularly extending sealing members 350, 450, and 550 which reside adjacent to each other in space 42'.

Seal members 350 and 550 are constructed of Polyarylether ketone and seal 450 is made of molybdenum-disulfide filled nylon. The space 42' is slightly larger than the seals and therefore may permit them to move slightly under pressurization.

The space 42', being oversized, ensures that pressure between the interface of the male member surface 22' and the female member surface 34' will act upon the cavity 371 of the first seal. Reference numeral 401 indicates the location of the pressure source being described. See FIG. 9. Sealing member 350 includes inner and outer surfaces 354 and 355 which lie respectively adjacent surfaces 22' and 32'. See FIG. 16. Sealing member 350 has first and second end surfaces 360 and 361, respectively, and the first end surface 360 is located adjacent the surface 36'. Sealing member 450 has inner and outer surfaces 454 and 455 which like the inner and outer surfaces of sealing member 350 also lie respectively adjacent surfaces 22' and 32'. Seal member 450 is a back up seal for seal 350 in the event that the first seal 350 does not seal properly when, for example, the male and female coupler halfs are in the process of engaging. Sealing member 450 includes first and second end surfaces 460 and 461, respectively. The first end surface 460 is located adjacent the second end surface 361 of sealing member 350. Sealing member 550 includes inner and outer surfaces 554 and 555 which also lie respectively adjacent surfaces 22' and 32'. Sealing member 550 includes first and second end surfaces 560 and 561, respectively and the first end surface is located adjacent the second end surface of sealing member 450.

The embodiment of FIGS. 8, 9, 10, 11 and 16 show the annular retainer 364 and the first end surface of the retainer is identified by the reference numeral 366. The second end surface 561 of sealing member 550 is located adjacent to retainer. See FIGS. 9 and 16.

A wall 370 extends into sealing member 350 and defines a cavity 371. The cavity 371 which is defined is quite similar to the cavities 71, 171 and 271 which have been discussed in connection with FIGS. 2, 5 and 7 respectively.

A wall 570 extends into the sealing member 550 and defines a cavity 571. The cavity 571 is quite similar to cavity 371 of sealing member 350 above, except cavity 371 is facing in the opposite direction.

Figure 9:
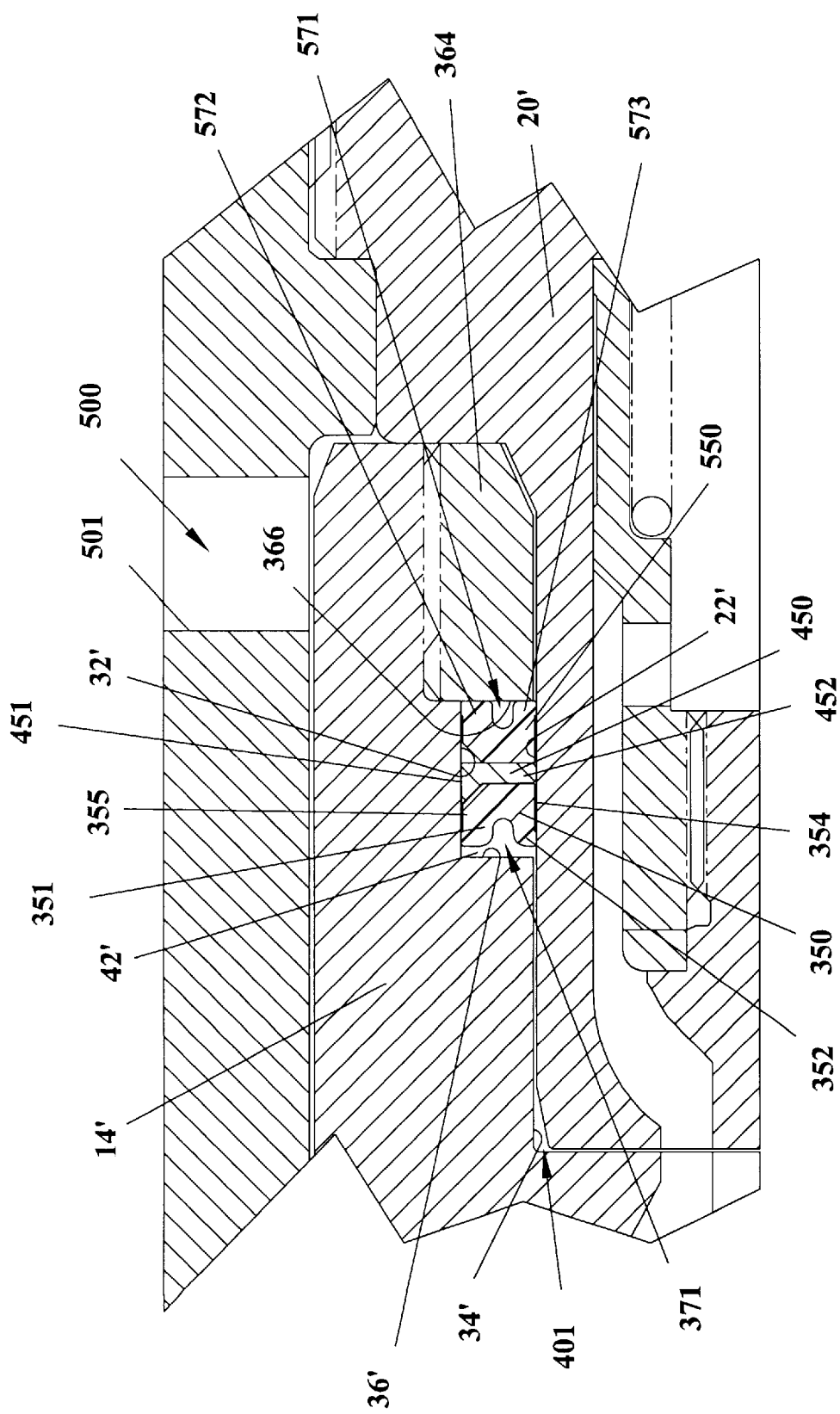
FIG. 9 is an enlarged fragmentary section of a portion of the hydraulic coupler illustrated in FIG. 8 illustrating a sealing arrangement employing first, second and third seals.
Figure 16:
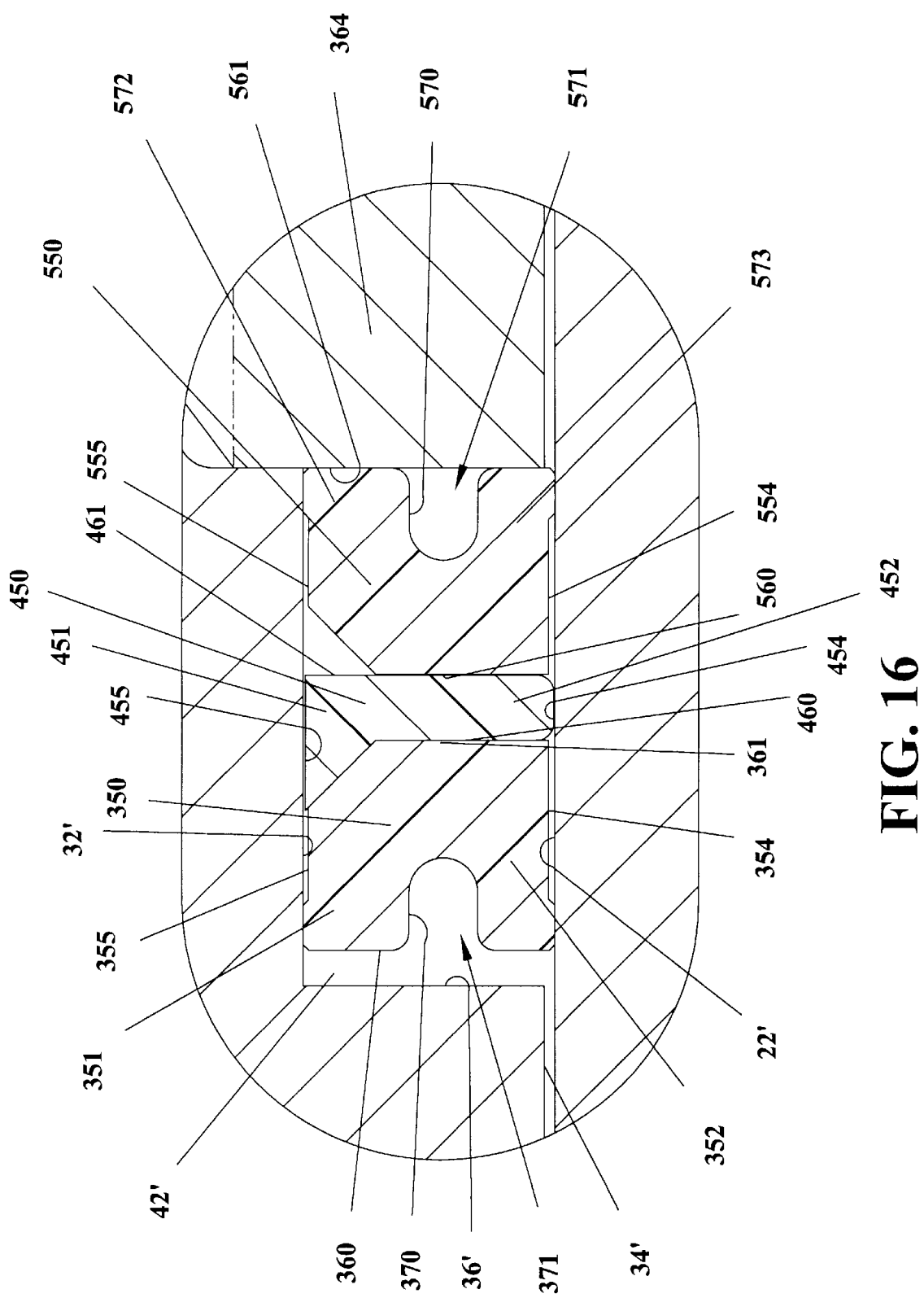
FIG. 16 is a further enlarged view of the seal arrangement of the hydraulic coupler illustrated FIG. 8; and, FIG. 17 is a further enlarged view of the seal arrangement of the hydraulic coupler illustrated in FIG. 12.

Seal 350, sometimes referred to hereinafter as the first seal, includes first 351 and second 352 leg portions. FIGS. 9 and 16 illustrates the seal arrangement of FIG. 8 in more detail. FIG. 16 illustrates the three seals, 350, 450, and 550 in detail. Pressure inside the coupling is applied to the cavity 371, and hence, legs 351 and 352 of seal 350 in the same manner as previously described in connection with another embodiment. Legs 351 and 352 are forced outwardly to seal against surfaces 32' of the female member and 22' of the male member. See FIG. 16.

Seal 550, sometimes referred to herein as the third seal includes a first leg portion 572 and a second leg portion 573. Similarly, pressure outside the coupling is applied to the cavity 571, legs 572 and 573 of seal 550. Legs 572 and 573 of seal 550 are forced outwardly to seal against surfaces 32' of the female member and 22' of the male member. Seawater, under high pressure at the bottom of the ocean, will attempt to enter the passageways of the hydraulic coupler at points denoted by reference numerals 499 and 500. See FIG. 8. Reference numeral 501 denotes a vent in the male half of the coupler. Seal 450, sometimes referred to herein as the second seal, includes a first leg portion 451 and a second leg portion 452. The first and second leg portions of seal 450 interfit with seal 350. Seal 450 is interposed between the first seal 350 and the third seal 550.

Figure 10:
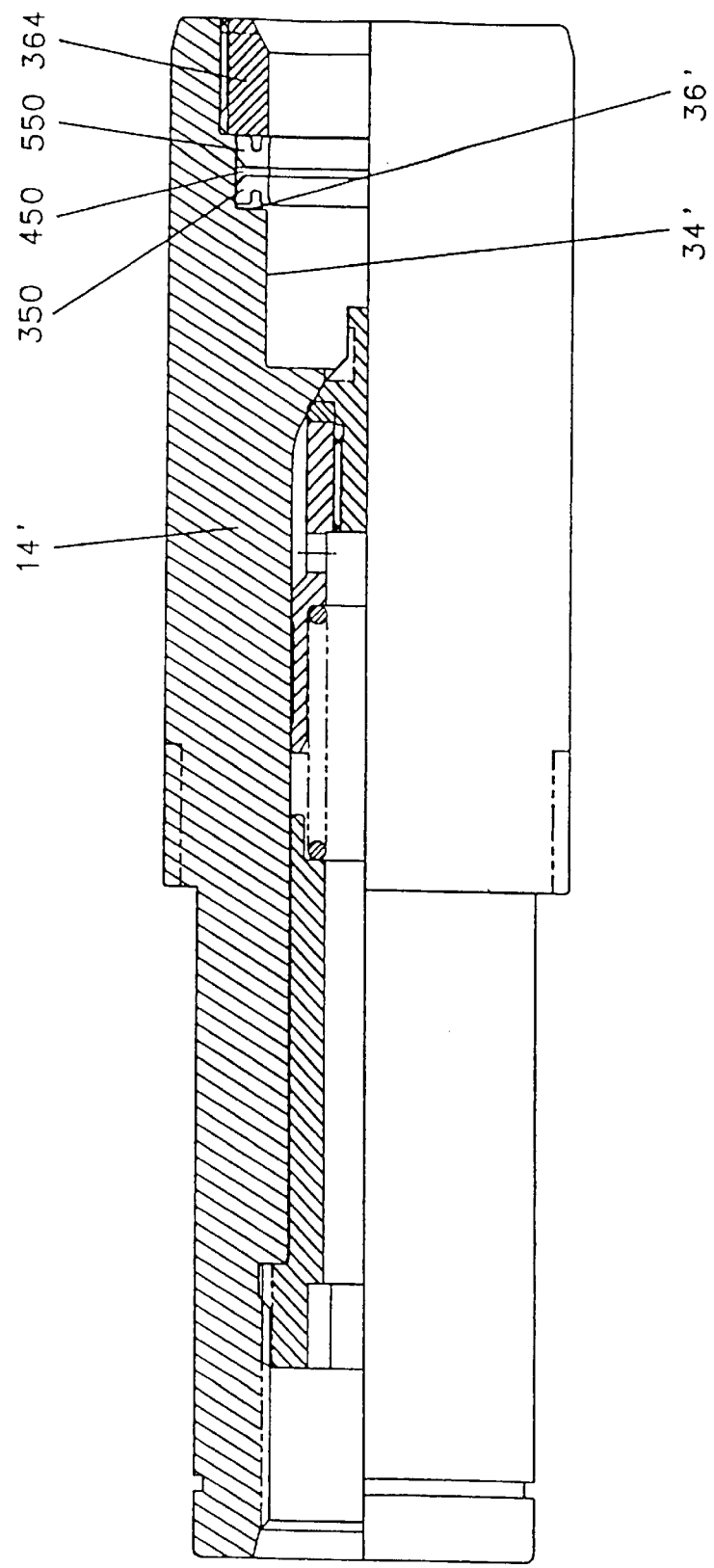
FIG. 10 is a view illustrating the female coupler member of FIG. 8 in the disconnected condition.
Figure 11:
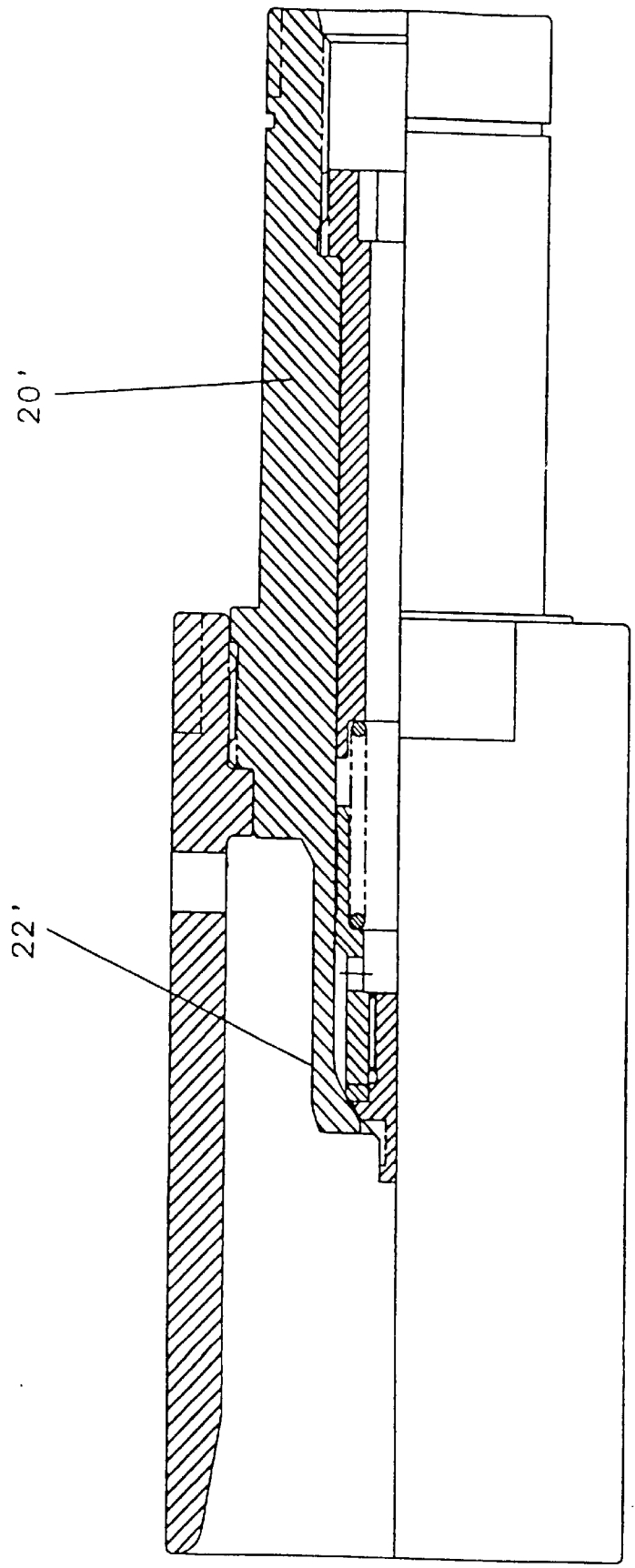
FIG. 11 is a view illustrating the male coupler member of FIG. 8 in the disconnected condition.

FIG. 10 illustrates the female half 14' of the coupling illustrated in FIG. 8 disconnected from the male half 20'. FIG. 10 illustrates the positioning of seals 350, 450, and 550 and their legs prior to engagement with the male member 20'. FIG. 11 illustrates the male half 20' of the coupling illustrated in FIG. 8 disconnected from the female half 14'. FIG. 16 illustrates an enlarged view of the seals 350, 450 and 500 in annular space 42'.

Figure 12:
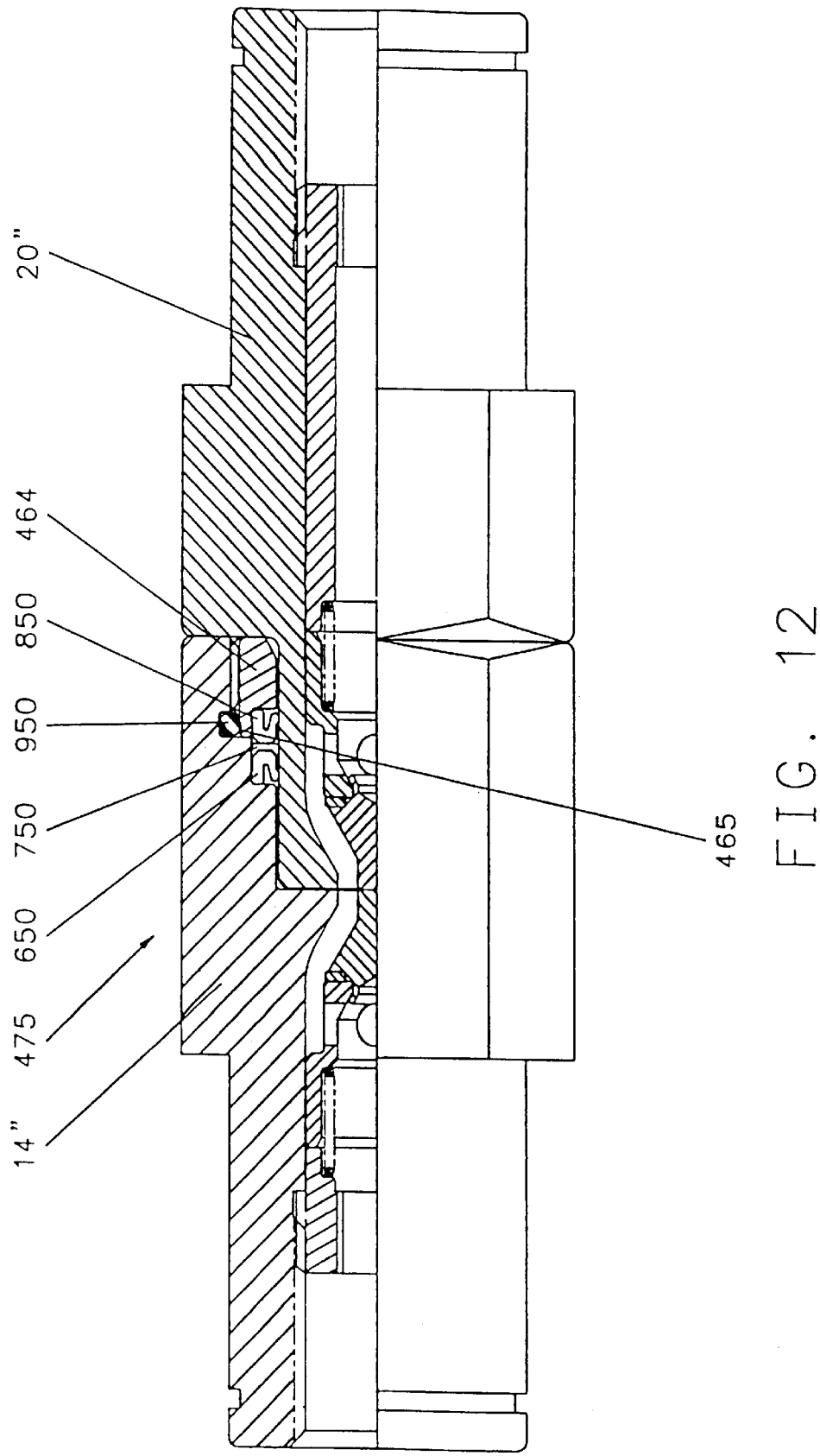
FIG. 12 is an elevational view of another hydraulic coupler partially in section and with the male and female members connected.

The coupling 475 illustrated in FIG. 12 includes three primary seals, 650, 750, 850 and an elastomeric O-ring 950. Additionally, the coupling 475 includes a male member 20", a retainer 464, and a female member 14". The retainer includes a lip portion 465 which includes an inner surface portion 33". The female member 14" includes axially extending, radially spaced surfaces 32" and 34", and a radially extending surface 36".

Seals 650 and 850 are made of polyarylether ketone and seal 750 is made of molybdenum disulfide filled nylon. However, those skilled in the art will appreciate that any of the materials in the chart of materials below may be employed in combination for any of the seals. The seal arrangement employed in the embodiment of FIG. 12 is different than the embodiment of FIG. 8. Namely, the retainer 464 extends in a lip portion 465 above the third seal. Additionally, as the retainer 464 bottoms out or abuts the female member 14" as illustrated in FIG. 12, the seals 650, 750 and 850 are held snugly in position. This is in contrast to the embodiment of FIG. 8 which provides room for the seals to position themselves in space 42".

Figure 13:
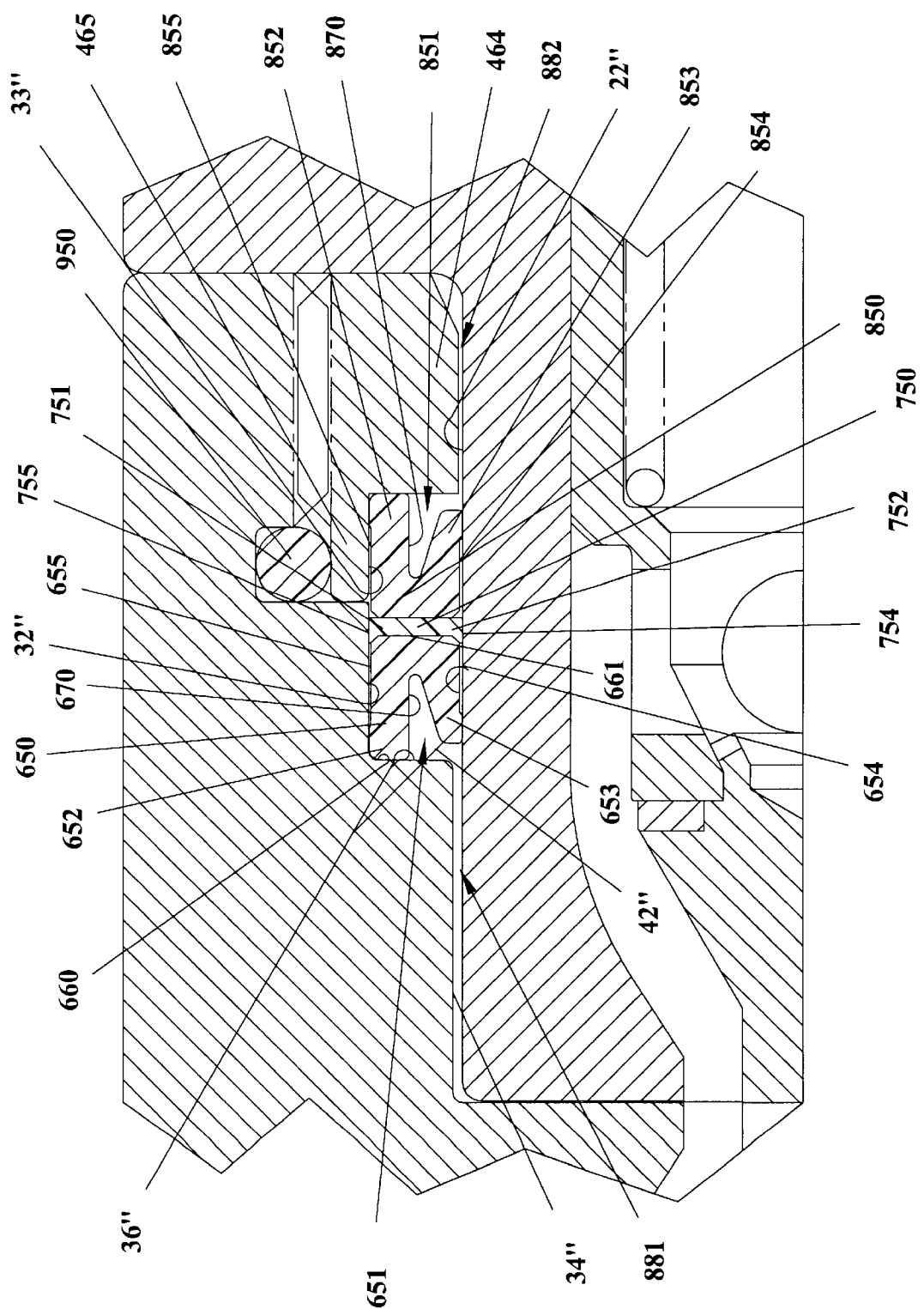
FIG. 13 is an enlarged fragmentary section of a portion of a hydraulic coupler illustrated in FIG. 12 illustrating a sealing arrangement employing first, second and third seals a modified retainer.

Reference numeral 42" is used in FIG. 13 to illustrate the annular space bounded by the external surface 22" of the male 20", the surface 33" on the lip 465 of retainer 464, the axially extending surface 32" of the female 14", and the radially extending surface 36" of the female member.

Wall means 670 form cavity 671 in first seal 650. First seal 650 includes a first leg 652 and a second leg 653. FIG. 13 illustrates that second leg 653 is shorter than first leg 652 of the first seal. Similarly, wall means 870 forms cavity 851 in third seal 850. Third seal 850 includes a first leg 852 and a second leg 853. FIG. 13 illustrates that second leg 853 is shorter than first leg 852.

The first seal 650 includes a first end surface 660 and a second end surface 661. Similarly, the second seal includes a first end surface 760 which interfits with the second end surface 661 of the first seal. Second seal includes a second end surface 761. Third seal 850 includes a first end surface 860 which interfits with the second end surface 761 of the second seal. Third seal 850 includes a second end surface 861. See FIG. 13.

Second seal 750 includes a first leg 751 and a second leg 752. The first end surface 660 abuts the radially extending surface 36" as shown in FIG. 13. Similarly, the second end surface 861 of the third seal abuts the retainer 464.

Reference numeral 881 in FIG. 13 illustrates the space between the external surface 22" of the male and the axially extending surface 34" of the female member from which pressure is applied to cavity 651 of the first seal 650. As pressure is applied to cavity 651, the first leg 652 is urged radially into sealing engagement with the surface 32" of the female member 14" and the second leg 653 is urged radially into sealing engagement with the surface 22" of the male member 20".

Reference numeral 882 in FIG. 13 illustrates the space between the external surface 22" of the male and the retainer 464 from which pressure is applied to cavity 851 of the third seal 850. As pressure is applied to cavity 851, the first leg 852 is urged radially into sealing engagement with the surface 33" of the retainer 464 and the second leg 853 is urged radially into sealing engagement with the surface 22" of the male member 20".

The second seal 750 is a back up seal for seal 650 in the event that seal 650 does not seal properly when, for example, the male and female coupler halfs are in the process of engaging.

Figure 14:
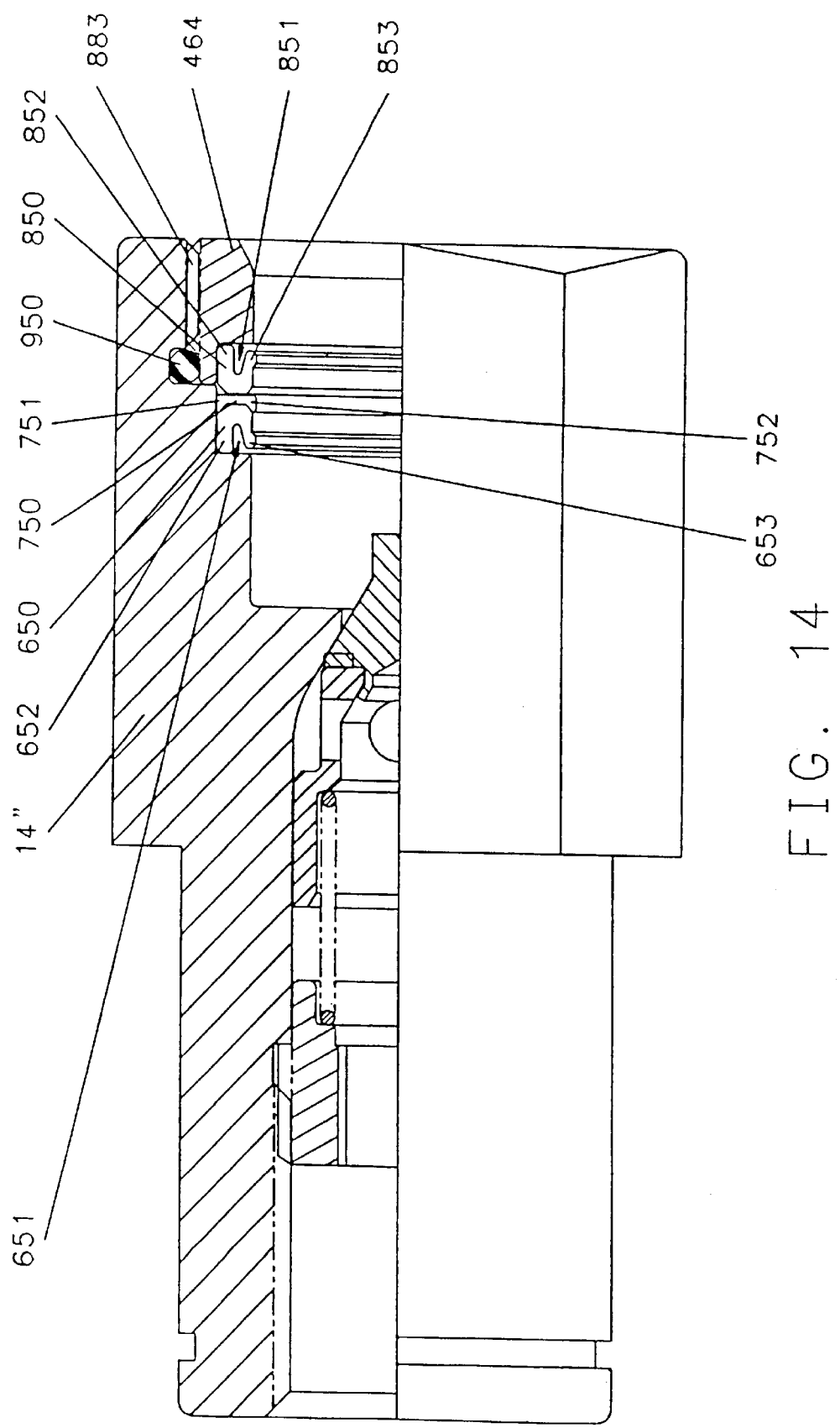
FIG. 14 is a view illustrating the female coupler of FIG. 12 in the disconnected condition.
Figure 15:
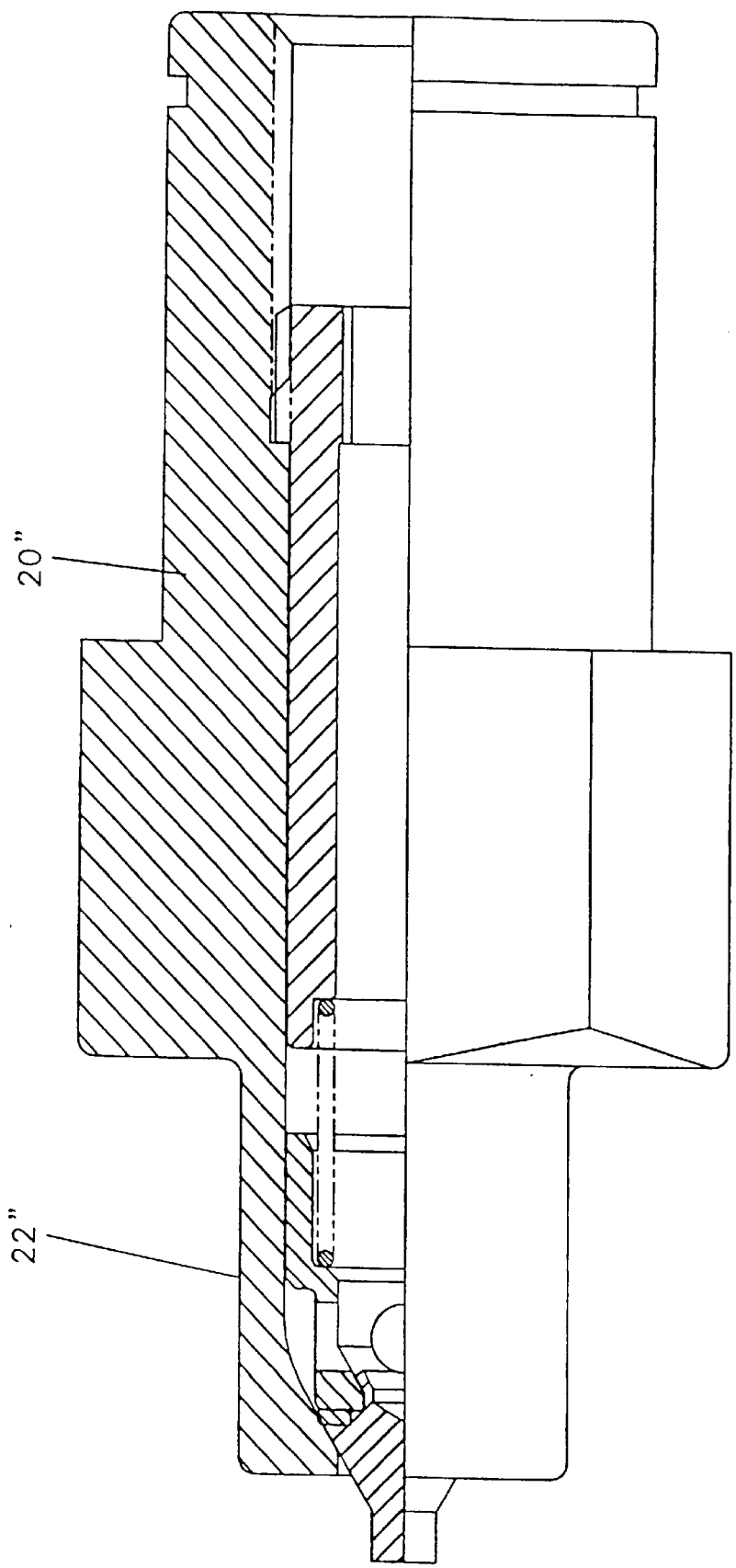
FIG. 15 is a view illustrating the male coupler of FIG. 12 in the disconnected condition.
Figure 17:
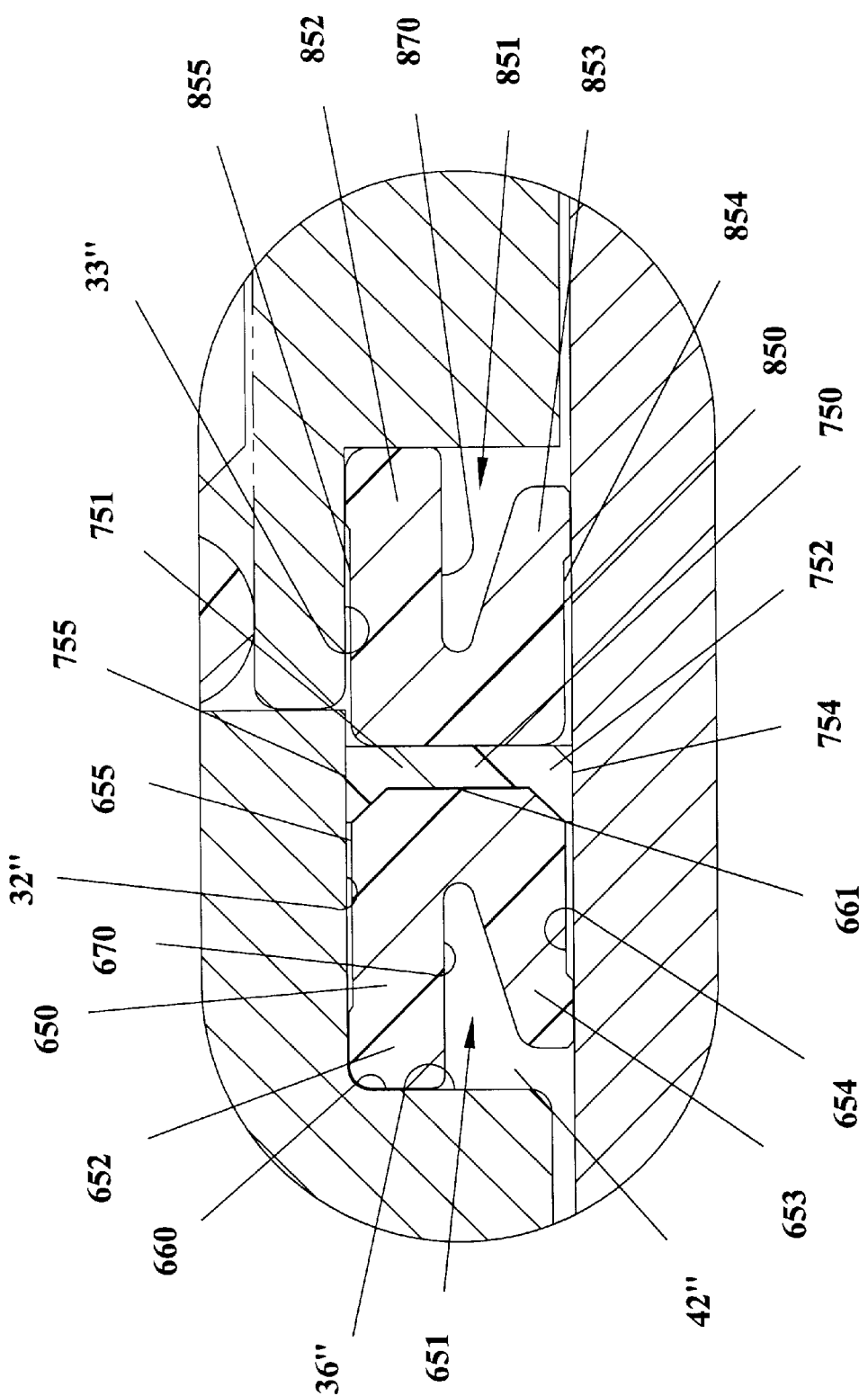

FIG. 14 illustrates the female half 14" of the coupling illustrated in FIG. 12 in the disconnected condition. FIG. 12 illustrates the elastomeric seal 950 positioned between the retainer 464 and the female member 14". Seal 950 prevents entrance of seawater past the threaded connection of the retainer 464 and the female half 14". FIG. 14 is a good illustration of the seals 650, 750 and 850 prior to engagement with the male coupler half 20". FIG. 15 illustrates the male half 20" disconnected from the female half 14". FIG. 17 illustrates an enlarged view of the seals 650, 750 and 850 in annular space 42".

FIGS. 14 and 17 illustrate that the second legs 653 and 853 of the first 650 and second 850 seals are shorter than their corresponding first legs 652 and 852. Shorter legs ensure the application of pressure from sources 881 and 882 to the respective cavities 651 and 851.

It has been found that in order to bring about the objects of the present invention as stated hereinabove that it is necessary that all of the sealing members of this invention be constructed of a polymeric elastomeric material which has a tensile strength of at least 5000 psi and a flexural modulus of elasticity of at least 300,000 psi. It is also desirable that the polymeric material have a high chemical resistance to acids, alkalis, hydrocarbons, ketones, ethers, esters, alcohols, salt solutions or a combination of chemicals normally found in oil exploration.

The particular materials that have been found to meet the objects of the present invention and to meet these specified and desired physical and chemical characteristics are found in the chart that follows below.

Where multiple seals are used as set forth in FIGS. 8, 9, 10, 12, 13, 14, 16 and 17, a combination of the seals listed below may be used.

| MATERIAL | TENSILE | ELONGATED MODULUS OF ELASTICITY | FLEXURAL RESISTANCE | CHEMICAL (ROCKWELL) | HARDNESS |
|---|---|---|---|---|---|
| 1. Poly (aryl ether-ketone) | 14500 psi | 150% | 550000 | 1 | M99 |
| 2. Polyphenylene sulfide | 12000 psi | 20–25% | 540000–600000 psi | 1 | M93 |
| 3. Polyamide-imide | 16000 psi | 5–18% psi | 1,000,000 | 2 | M119 |
| 4. Molybdenum disulfide filled nylon | 8000 psi | 5–150% | 400000 psi | 3 | R110 |

With the use of a sealing member having the herein described physical and chemical characteristic in combination with the male and female members of a hydraulic coupler bring about the desired objects as expressed hereinabove. The opening in the sealing members 50, 150, 250, 350, 450, 550, 650, 750, and 850 or in other words the inner diameter of the sealing member which the male member "sees", is essentially the same diameter each time the male member enters the female member as they are moved from uncoupled to coupled condition. As a result the same consistent seal is provided because the sealing member of the present invention has the qualities to return to the same consistent diameter when the members are uncoupled. This overcomes the disadvantage found in metal sealing members or rings where the opening gradually becomes larger and larger with each uncoupling or use resulting in a less and less effective seal against fluid flow along the interface between the sealing member and the movable coupler parts.

Material number 1 in the chart is sold under the trademark VICTREX PEEK by ICI Americas Inc. of Wilmington, Del. Material number 2 is sold under the trademark TECHTRON by The Polymer Corporation of Reading, Pa. Material number 3 is sold under the trademark TORLON by Amoco Chemical Corporation. Material number 4 is sold under the trademark NYLATRON by The Polymer Corporation of Reading, Pa.

The present invention prevents the blowout of the sealing members 50, 150, 250, 350, 450, 550, 650, 750 and 850 during separation of the male and female members.

While the invention has been described in combination with embodiments thereof, it is evident that many alternatives, modifications and variations will be apparent to those skilled in the art in light of the foregoing description. Accordingly, it is intended to embrace all such alternatives, modifications and variations that fall within the spirit and scope of the appended claims.

What is claimed is:

1. A balanced hydraulic coupling comprising a male member, a female member, a spacer, a first seal and a second seal, a first and second annulus formed between said male member, said female member and said spacer, said first seal includes a first cavity and a second cavity, said second seal includes a first cavity and a second cavity, said spacer includes a first leg and a second leg, said first and second spacer legs slidingly engage said first cavity of said first seal and said first cavity of said second seal respectively, said first cavities of said first and said second seals each include first and second legs and said second cavities of said first and second seals each include a first leg, said seals being a polymeric material having a tensile strength of at least 5,000 psi and a flexural modulus of elasticity of at least 300,000 psi, said first and second legs of said first cavities of said seals engaging said male and female member respectively upon the application of pressure to said first cavity of said first seal and said first cavity of said second seal and, said first legs of said second cavities of said seals engaging said female member upon application of pressure to said second cavity of said first seal and said second cavity of said second seal.

2. A hydraulic coupling comprising a male member and a female member, an annulus formed between said male and female members, said female member having a first radially extending surface, said male member having an external circumferentially extending surface, a seal, said seal residing in said annulus, a retainer, said retainer abuts said seal to hold said seal in said annular space, said female member having a recess, said seal having a generally radially extending flange, said flange resides in said recess of said female member, said seal having a first cavity, said first cavity facing said first radially extending surface and creating a generally c-shaped appearance in cross section, said seal having a second cavity, said second cavity facing said circumferentially extending surface of said male member and creating a generally inverted u-shape appearance in cross section, said seal being a polymeric material having a tensile strength of at least 5,000 psi and a flexural modulus of at least 300,000 psi.

* * * * *